(12) United States Patent
Liu et al.

(10) Patent No.: US 12,526,023 B2
(45) Date of Patent: Jan. 13, 2026

(54) CSI AGE REPORT FOR ENHANCEMENT IN HIGH DOPPLER CHANNEL

(71) Applicant: QUALCOMM Incorporated, San Diego, CA (US)

(72) Inventors: Kangqi Liu, San Diego, CA (US); Yu Zhang, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 309 days.

(21) Appl. No.: 18/549,261

(22) PCT Filed: May 13, 2021

(86) PCT No.: PCT/CN2021/093566
§ 371 (c)(1),
(2) Date: Sep. 6, 2023

(87) PCT Pub. No.: WO2022/236766
PCT Pub. Date: Nov. 17, 2022

(65) Prior Publication Data
US 2024/0154673 A1    May 9, 2024

(51) Int. Cl.
*H04B 7/06* (2006.01)
*H04B 17/309* (2015.01)
(Continued)

(52) U.S. Cl.
CPC ......... *H04B 7/0626* (2013.01); *H04B 7/0632* (2013.01); *H04B 7/0639* (2013.01); *H04B 17/336* (2015.01)

(58) Field of Classification Search
CPC .. H04B 7/0626; H04B 7/0632; H04B 7/0639; H04B 17/336; H04B 17/309;
(Continued)

(56) References Cited

U.S. PATENT DOCUMENTS

2007/0077952 A1* 4/2007 Sartori ................ H04L 1/0015
455/67.11
2014/0211642 A1 7/2014 Du et al.
(Continued)

FOREIGN PATENT DOCUMENTS

| CN | 103580820 A | 2/2014 |
|---|---|---|
| CN | 109314562 A | 2/2019 |
| CN | 109644033 A | 4/2019 |

OTHER PUBLICATIONS

Supplementary European Search Report—EP21941338—Search Authority—Munich—Dec. 16, 2024.
(Continued)

*Primary Examiner* — Harry H Kim
(74) *Attorney, Agent, or Firm* — NORTON ROSE FULBRIGHT US LLP

(57) ABSTRACT

This disclosure provides systems, methods, and devices for wireless communication that support CSI age reporting. In a first aspect, a method of wireless communication includes receiving, by a wireless communication device, a message indicating channel state information (CSI) age reporting; transmitting, by the wireless communication device, a CSI report associated with a first window length and a second window length and indicating at least the second window length, wherein the first window length is associated with computing CSI before an uplink slot of the CSI report, and wherein the second window length is associated with a period of time for which the CSI report is valid. Other aspects and features are also claimed and described.

30 Claims, 10 Drawing Sheets

(51) Int. Cl.
  *H04B 17/336* (2015.01)
  *H04L 1/00* (2006.01)
  *H04L 5/00* (2006.01)
  *H04W 72/1273* (2023.01)
  *H04W 72/23* (2023.01)

(58) Field of Classification Search
  CPC ... H04L 1/0026; H04L 1/0027; H04L 1/0028; H04L 1/0003; H04L 5/0048; H04W 72/1273; H04W 72/23
  See application file for complete search history.

(56) References Cited

U.S. PATENT DOCUMENTS

| | | | | |
|---|---|---|---|---|
| 2015/0215018 | A1* | 7/2015 | Xiong | H04W 72/563 370/329 |
| 2019/0173551 | A1* | 6/2019 | Wang | H04B 7/0626 |
| 2020/0145077 | A1* | 5/2020 | Sarkis | H04L 1/0026 |
| 2020/0259545 | A1 | 8/2020 | Bai et al. | |
| 2021/0167828 | A1* | 6/2021 | Shao | H04L 1/0004 |
| 2022/0173829 | A1* | 6/2022 | Huang | H04L 5/0057 |

OTHER PUBLICATIONS

International Search Report and Written Opinion—PCT/CN2021/093566—ISA/EPO—Feb. 10, 2022.

Qualcomm Incorporated: "CSI Enhancements: MTRP and FR1 FDD Reciprocity", 3GPP TSG RAN WG1 #102-e, R1-2006796, e-Meeting, Aug. 17, 2020-Aug. 28, 2020, pp. 1-11, Aug. 28, 2020 (Aug. 28, 2020), the whole document.

Spreadtrum Communications: "Discussion on CSI Enhancement for Multiple TRP/Panel Transmission", 3GPP TSG RAN WG1#102-e, R1-2006262, e-Meeting, Aug. 17-28, 2020, 4 Pages.

* cited by examiner

| Index | Doppler Frequency | W1 | W2 |
|---|---|---|---|
| 1 | ... | ... | ... |
| 2 | ... | ... | ... |
| 3 | ... | ... | ... |
| 4 | ... | ... | ... |

600

| Index | Doppler Frequency | W1 |
|---|---|---|
| 1 | ... | ... |
| 2 | ... | ... |
| 3 | ... | ... |
| 4 | ... | ... |

610

| Index | Doppler Frequency | W2 |
|---|---|---|
| 1 | ... | ... |
| 2 | ... | ... |
| 3 | ... | ... |
| 4 | ... | ... |

CSI AGE REPORT FOR ENHANCEMENT IN HIGH DOPPLER CHANNEL

TECHNICAL FIELD

Aspects of the present disclosure relate generally to wireless communication systems, and more particularly, to Channel State Information (CSI) reporting. Some features may enable and provide improved communications, including CSI age reporting.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication includes receiving, by a wireless communication device, a message indicating channel state information (CSI) age reporting; and transmitting, by the wireless communication device, a CSI report associated with a first window length and a second window length and indicating at least the second window length, wherein the first window length is associated with computing CSI before an uplink slot of the CSI report, and wherein the second window length is associated with a period of time for which the CSI report is valid.

In an additional aspect, an apparatus configured for wireless communication is disclosed. The apparatus includes at least one processor, and a memory coupled to the processor. The processor is configured to receive a message indicating channel state information (CSI) age reporting; and transmit a CSI report associated with a first window length and a second window length and indicating at least the second window length, wherein the first window length is associated with computing CSI before an uplink slot of the CSI report, and wherein the second window length is associated with a period of time for which the CSI report is valid.

In an additional aspect, a non-transitory computer-readable medium having program code recorded thereon. The program code further includes code to receive a message indicating channel state information (CSI) age reporting; and transmit a CSI report associated with a first window length and a second window length and indicating at least the second window length, wherein the first window length is associated with computing CSI before an uplink slot of the CSI report, and wherein the second window length is associated with a period of time for which the CSI report is valid In an additional aspect, an apparatus configured for wireless communication is disclosed. The apparatus includes means for receiving a message indicating channel state information (CSI) age reporting; and means for transmitting a CSI report associated with a first window length and a second window length and indicating at least the second window length, wherein the first window length is associated with computing CSI before an uplink slot of the CSI report, and wherein the second window length is associated with a period of time for which the CSI report is valid In another aspect of the disclosure, a method for wireless communication includes transmitting, by a wireless communication device, a message indicating channel state information (CSI) age reporting; and receiving, by the wireless communication device, a CSI report associated with a first window length and a second window length and indicating at least the second window length, wherein the first window length is associated with computing CSI before an uplink slot of the CSI report, and wherein the second window length is associated with a period of time for which the CSI report is valid.

In an additional aspect, an apparatus configured for wireless communication is disclosed. The apparatus includes at least one processor, and a memory coupled to the processor. The processor is configured to transmit a message indicating channel state information (CSI) age reporting; and receive a CSI report associated with a first window length and a second window length and indicating at least the second window length, wherein the first window length is associated with computing CSI before an uplink slot of the CSI report, and wherein the second window length is associated with a period of time for which the CSI report is valid.

In an additional aspect, a non-transitory computer-readable medium having program code recorded thereon. The program code further includes code to transmit a message indicating channel state information (CSI) age reporting; and receive a CSI report associated with a first window length and a second window length and indicating at least the second window length, wherein the first window length is associated with computing CSI before an uplink slot of the CSI report, and wherein the second window length is associated with a period of time for which the CSI report is valid.

In an additional aspect, an apparatus configured for wireless communication is disclosed. The apparatus includes means for transmitting a message indicating channel state information (CSI) age reporting; and means for receiving a CSI report associated with a first window length and a second window length and indicating at least the second window length, wherein the first window length is associated with computing CSI before an uplink slot of the CSI report, and wherein the second window length is associated with a period of time for which the CSI report is valid.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 6 is a diagram illustrating examples of codebooks for determining and indicating parameters for enhanced CSI age reporting operations.

Like reference numbers and designations in the various drawings indicate like elements.

DETAILED DESCRIPTION

Figure 1:
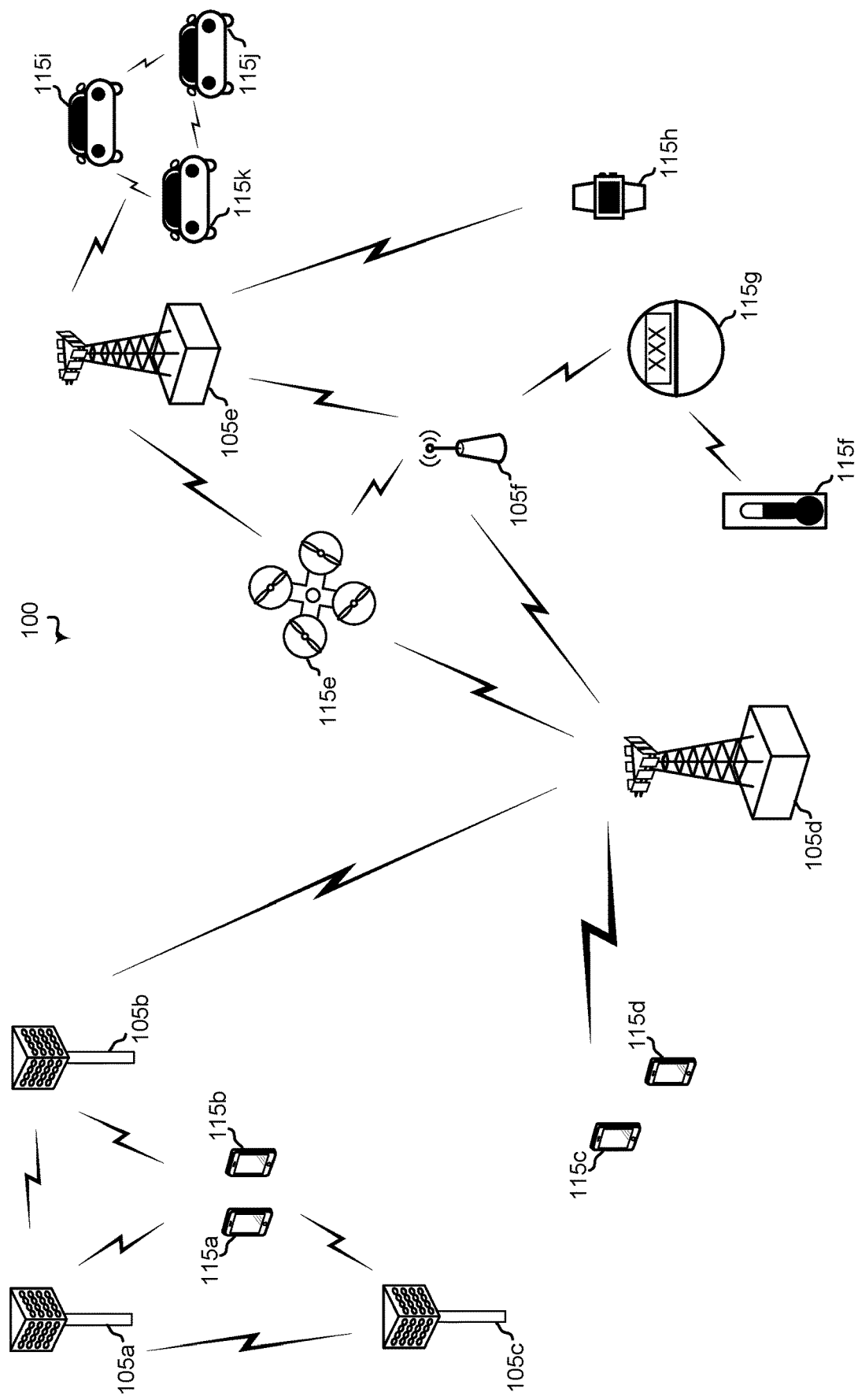
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-module, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100, such as a wireless network which supports CSI age reporting operations. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
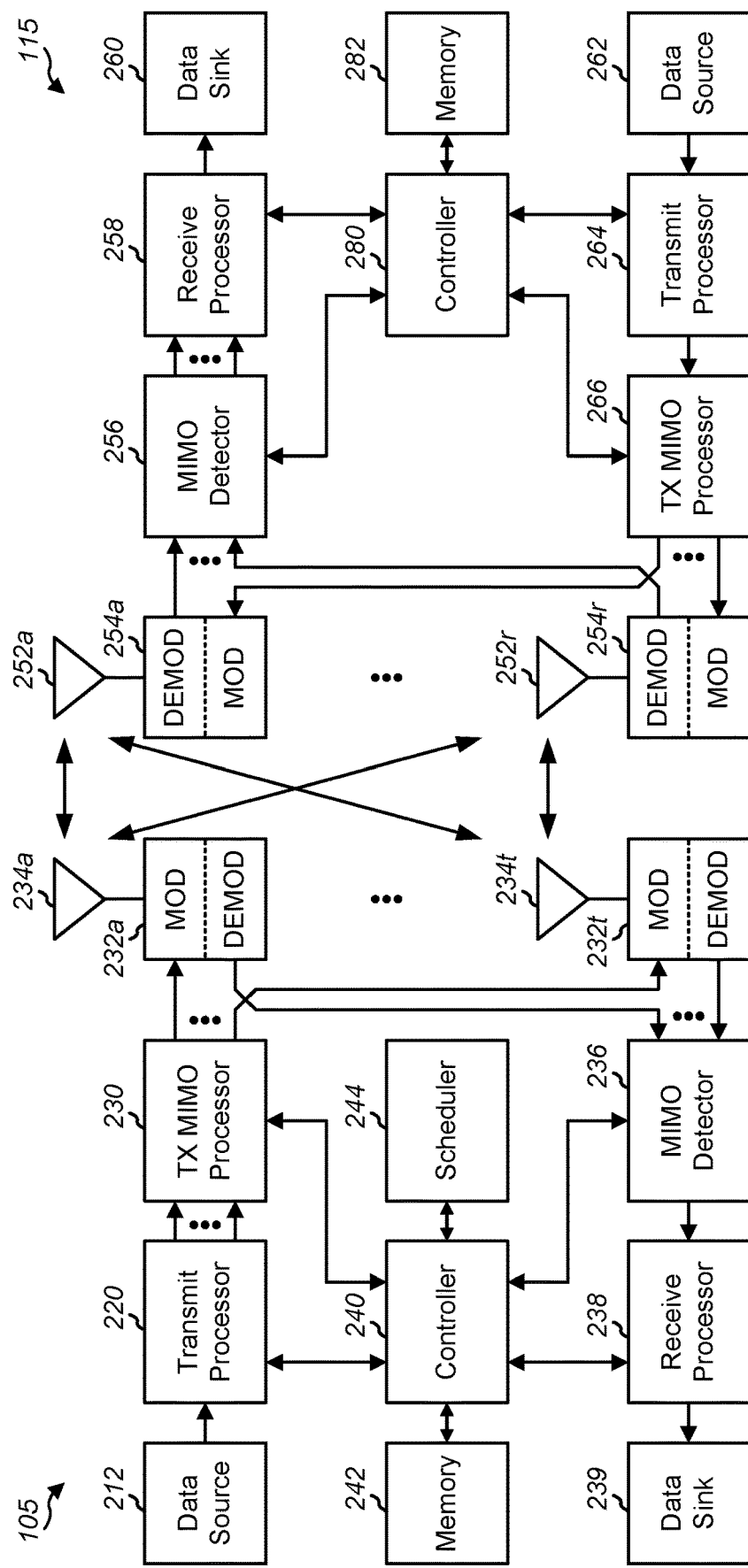
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution of CSI age reporting operations as illustrated in FIGS. 4, 5, 7, and 8, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3A:
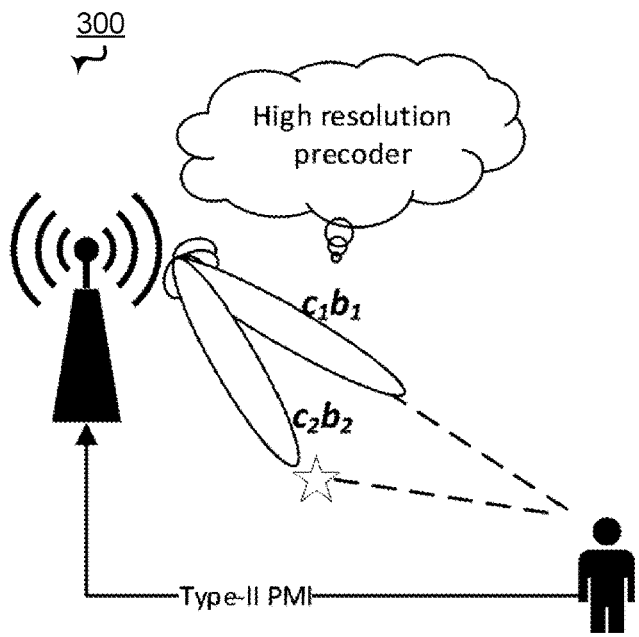
FIGS. 3A-C are diagrams illustrating examples of different mobility and Doppler frequency scenarios.
Figure 3B:
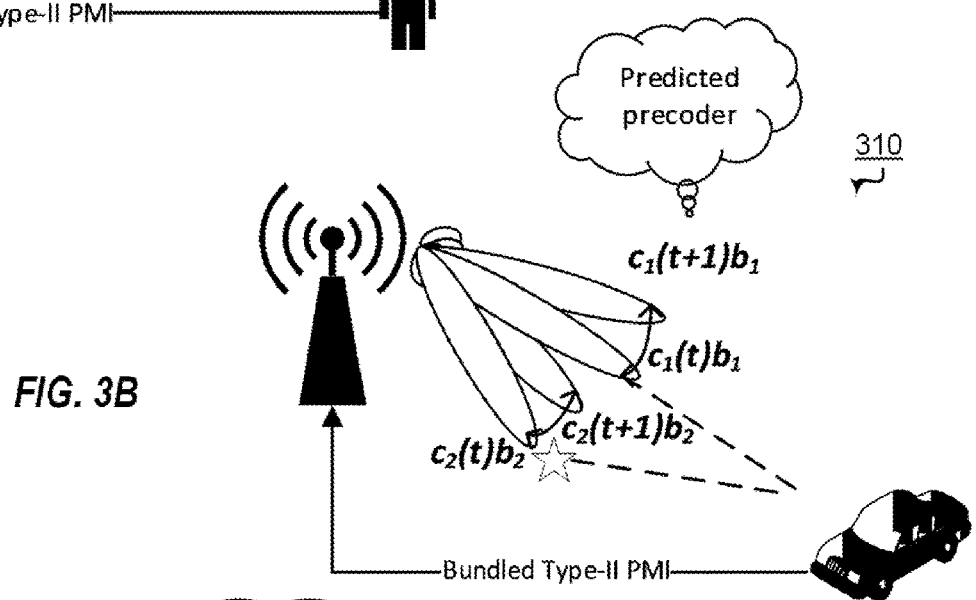
Figure 3C:
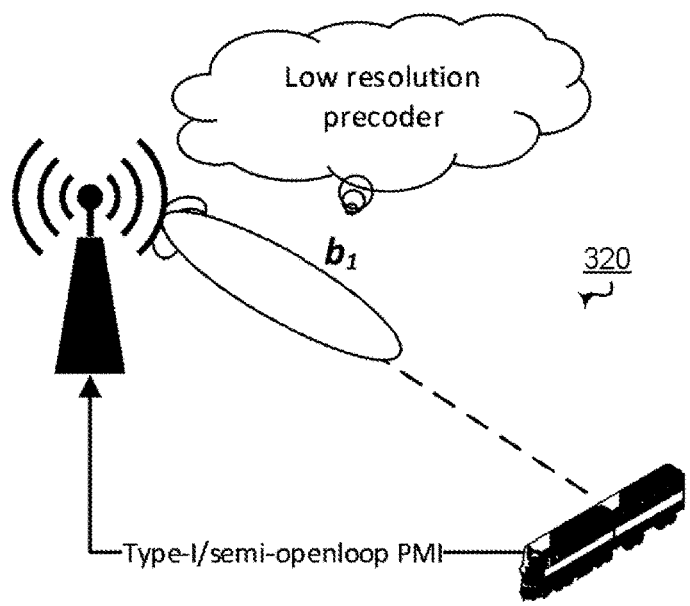

FIGS. 3A-C illustrate example diagrams illustrating different mobility scenarios and corresponding precoder operations. In FIG. 3A, a low mobility scenario 300 of a UE is shown, such as a person walking with a UE. A UE can be mobile, but the speed, and corresponding change in distance between transmissions is relatively low. Accordingly, the Doppler frequency (an estimated frequency adjustment to account for Doppler shift) is lower, and a high or higher resolution precoder may be used. For example, a type II precoder/type II precoding matrix identifier (PMI) may be used.

In FIG. 3B, a medium mobility scenario 310 of a UE is shown, such a UE integrated into a vehicle or a personal UE which riding in a vehicle. A car or bike may move much faster than a person on foot and thus may have a higher speed. This higher speed may increase the Doppler frequency and a lower resolution precoder may offer higher performance, such as predicted precoder.

In FIG. 3C, a high mobility scenario 320 of a UE is shown, such a UE integrated into a high-speed vehicle or a personal UE which is riding in a high-speed vehicle. A train or plane may move much faster than a car and thus may have a higher speed. This higher speed may increase the Doppler frequency and a lower resolution precoder may offer higher performance, such as a Type I Channel State Information (CSI) precoder or semi-open loop CSI precoder. In such scenarios it is harder to track beams so a switch to a Type I precoder with broader coverage can increase performance.

The above CSI reporting schemes may not track a fast fading channel or a high-Doppler channel very well due to the small coherence time. There may be several dBs of Signal-to-interference-plus-noise ratio (SINR) variation per CSI feedback period, which may make devices hard to track and predict. For example, there may be a difference or gap between modulation coding scheme (MCS) feedback and scheduled MCS. The reported CSI provided from the UE to the network may be outdated, which may lead to the inaccuracy of the link adaptation and negatively affects the overall system performance.

These fluctuations can be accounted for or negated by using CSI report ageing, such as indicating a validity window for the CSI report information. For example, a device can indicate a period of time for which the reported CSI values are valid, that is more likely to be accurate. Additionally, the CSI report can be generated based on average or long-term metrics to smooth out the individual variations. By using long-term metrics, the individual variations can be accounted for, that is there affect can be reduced in the short-term, and the resulting CSI report value may be more accurate for a longer period of time.

Figure 3D:
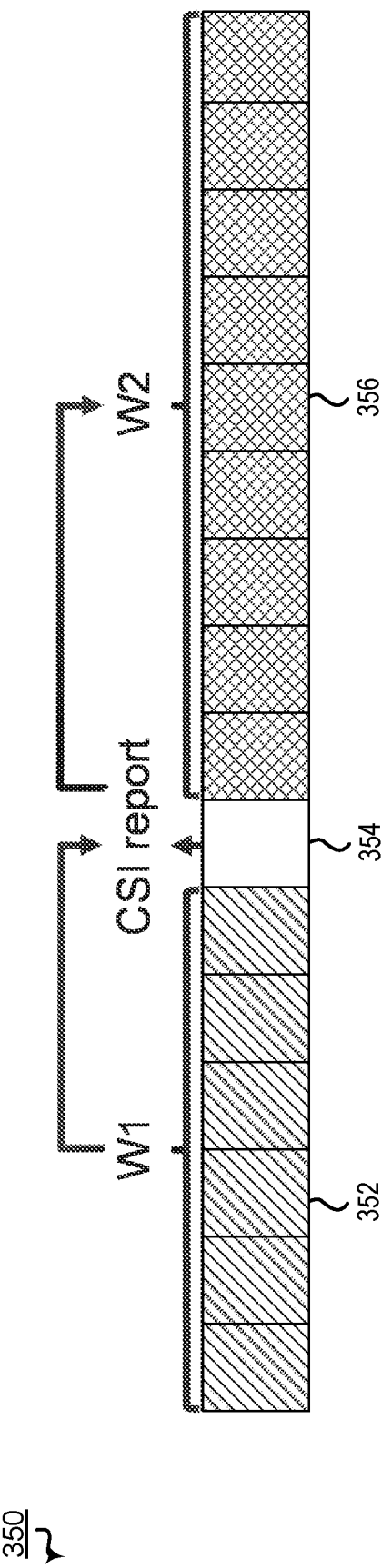
FIG. 3D is a block diagram illustrating CSI Report calculation and validity windows.

FIG. 3D illustrates a block diagram depicting CSI Report calculation and validity windows. In FIG. 3D, a timing (slot) diagram 350 is illustrated depicting a plurality of slots. The timing diagram 350 illustrates a first window (W1) 352 including a first plurality of slots, a CSI report slot 354, and a second window (W2) 356 including a second plurality of slots.

The first window (W1) 352 includes or corresponds to a duration where a device (e.g., UE) performs channel measurements on communications (e.g., received transmissions) and generates channel measurement information/channel state information.

The CSI report slot 354 includes or corresponds to a slot where the device is to feedback or report the channel state information. In the aspects described herein the CSI report transmitted in the CSI report slot 354 is associated with two windows, as opposed to just one. That is the CSI report indicates or is configured to be valid for a set duration, that is the duration of the second window.

The second window (W2) 356 includes or corresponds to a duration where the CSI report is valid. For example, in higher mobility and/or higher Doppler frequency situations, the CSI report may be valid for a smaller duration as compared to lower mobility scenarios and/or lower Doppler frequency situations. By indicating or configuration the age or validity of the CSI report, a second/transmitting device may more accurately transmit data. For example, the transmitting device may more accurately precode the data. To illustrate, the transmitting device may use a higher performing precoding scheme and indicate or generate a higher performing precoding indication or index. Such CSI age reporting may enable higher performance as compared to legacy or previous CSI reporting procedures, such as CQI based and/or loop based (e.g., outer loop link adaption (OLLA)) CSI reporting procedures. Although, the first window 352 and the second window 356 have a particular number of slots in the example of FIG. 3D, in other examples the first window 352, the second window 356, or both may have a different number of slots, such as a larger number of slots as described below.

Figure 4:
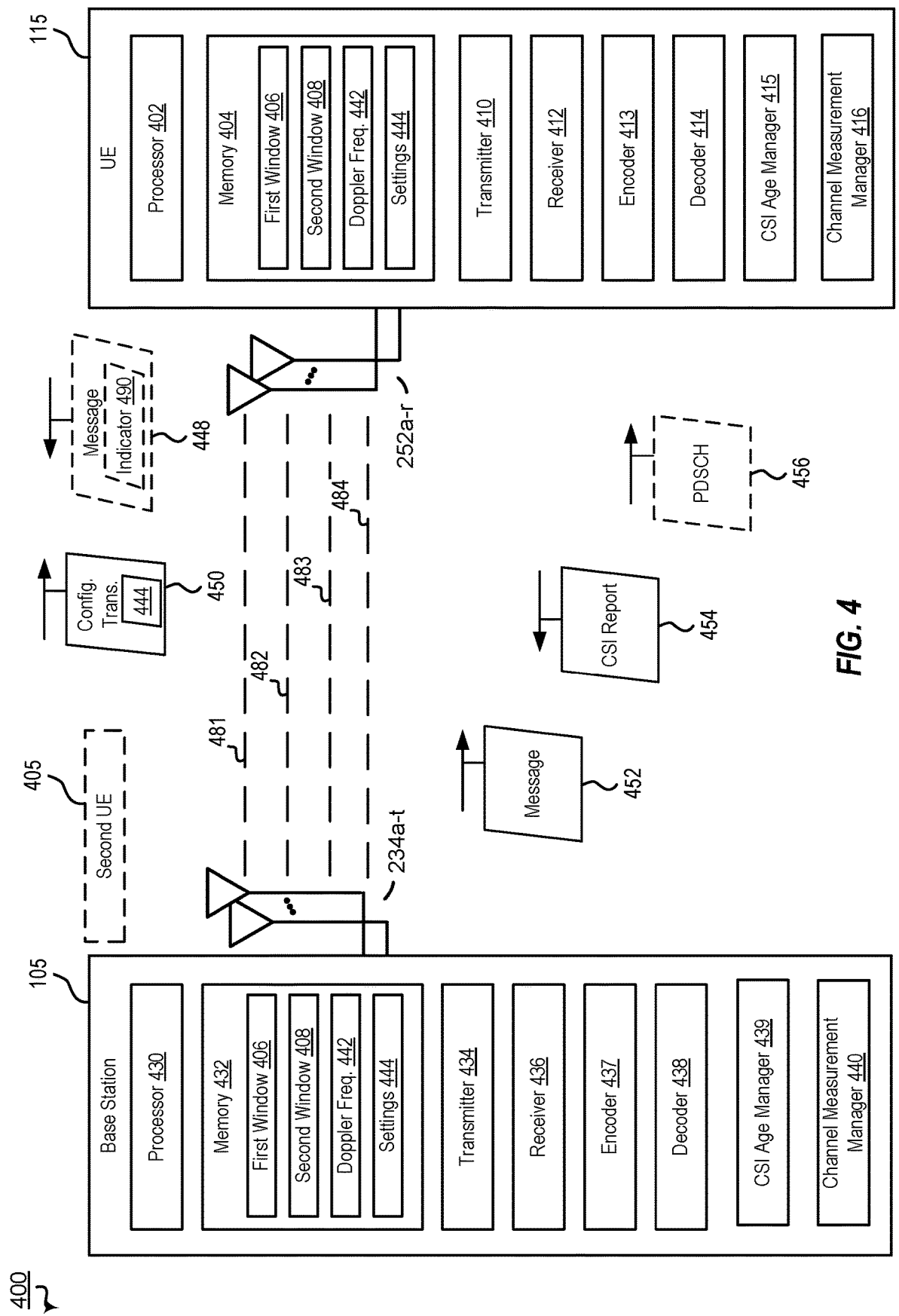
FIG. 4 is a block diagram illustrating an example wireless communication system that supports CSI age reporting operations according to one or more aspects.

FIG. 4 illustrates an example of a wireless communications system 400 that supports CSI age reporting operations in accordance with aspects of the present disclosure. In some examples, wireless communications system 400 may implement aspects of wireless communication system 100. For example, wireless communications system 400 may include multiple wireless communication devices and optionally a network entity. In the example of FIG. 4, the wireless communications system 400 includes a base station 105, a UE 115, and optionally a second UE. Use of supports CSI age reporting operations may improve feedback reporting and precoder generation. Improved feedback reporting and precoder generation may reduce latency and increase throughput by decreasing failed transmissions and dropped calls. Thus, network and device performance can be increased.

UE 115 and base station 105 may be configured to communicate via frequency bands, such as FR1 having a frequency of 410 to 7125 MHz, FR2 having a frequency of 24250 to 52600 MHz for mm-Wave, and/or one or more other frequency bands. It is noted that Sub-carrier spacing (SCS) may be equal to 15, 30, 60, or 120 kHz for some data channels. UE 115 and base station 105 may be configured to communicate via one or more component carriers (CCs), such as representative first CC 481, second CC 482, third CC 483, and fourth CC 484. Although four CCs are shown, this is for illustration only, more or fewer than four CCs may be used. One or more CCs may be used to communicate control channel transmissions, data channel transmissions, and/or sidelink channel transmissions.

Such transmissions may include a Physical Downlink Control Channel (PDCCH), a Physical Downlink Shared Channel (PDSCH), a Physical Uplink Control Channel (PUCCH), a Physical Uplink Shared Channel (PUSCH), a Physical Sidelink Control Channel (PSCCH), a Physical Sidelink Shared Channel (PSSCH), or a Physical Sidelink Feedback Channel (PSFCH). Such transmissions may be scheduled by aperiodic grants and/or periodic grants.

Each periodic grant may have a corresponding configuration, such as configuration parameters/settings. The periodic grant configuration may include configured grant (CG) configurations and settings. Additionally, or alternatively, one or more periodic grants (e.g., CGs thereof) may have or be assigned to a CC ID, such as intended CC ID.

Each CC may have a corresponding configuration, such as configuration parameters/settings. The configuration may include bandwidth, bandwidth part, HARQ process, TCI state, RS, control channel resources, data channel resources, or a combination thereof. Additionally, or alternatively, one or more CCs may have or be assigned to a Cell ID, a Bandwidth Part (BWP) ID, or both. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC may also have corresponding management functionalities, such as, beam management, BWP switching functionality, or both. In some implementations, two or more CCs are quasi co-located, such that the CCs have the same beam and/or same symbol.

In some implementations, control information may be communicated via UE 115 and base station 105. For example, the control information may be communicated using Medium Access Control (MAC) Control Element (MAC CE) transmissions, Radio Resource Control (RRC) transmissions, sidelink control information (SCI) transmissions, another transmission, or a combination thereof.

UE 115, and optionally second UE 405, can include a variety of components (e.g., structural, hardware components) used for carrying out one or more functions described herein. For example, these components can includes processor 402, memory 404, transmitter 410, receiver 412, encoder, 413, decoder 414, CSI report age manager 415, channel measurement manager 416, and antennas 252a-r. Processor 402 may be configured to execute instructions stored at memory 404 to perform the operations described herein. In some implementations, processor 402 includes or corresponds to controller/processor 280, and memory 404 includes or corresponds to memory 282. Memory 404 may also be configured to store first window data 406, second window data 408, Doppler frequency data 442, settings data 444, or a combination thereof, as further described herein.

The first window data 406 includes or corresponds to data associated with or corresponding to a duration for calculating CSI report information. The first window data 406 may indicate a first window length, a first window indicated by the first window length (e.g., a measurement window), or both. The first window length may be indicated in a number of slots and the first window may correspond to a duration of the first window length prior to a particular slot, such as the slot where the CSI report was sent. Additionally, the first window data 406 may indicate a method of determination or calculation.

The second window data 408 includes or corresponds to data associated or corresponding to a duration for using the CSI report information. The second window data 408 may indicate a second window length, a second window indicated by the second window length (e.g., a validity window), or both. The second window length may be indicated in a number of slots and the second window may correspond to a duration of the second window length from a particular slot, such as the slot where the CSI report was sent.

Additionally, the second window data 408 may indicate a method of determination or calculation. The first and second window data 408 may be indicated directly or indirectly, such as by an index value as described further with reference to FIG. 6.

The Doppler frequency data 442 includes or corresponds to data associated with an estimated frequency adjustment for device movement and/or Doppler shift. Higher Doppler frequencies correspond to higher device mobility.

The settings data 444 includes or corresponds to data associated with CSI report age operations. The settings data 444 may include settings and/or conditions data for determination, indication, or reporting, operations for CSI reports with age/validity indications. The settings data 444 may include mode data, such as certain parameters or threshold to use based on an operating mode, codebook data, Block Error Rate (BLER) thresholds data, Channel Quality Information (CQI) data, CSI report settings, etc. In some implementations, the UE 115 may store other data, such as channel measurement data, CSI report data, Signal-to-interference-plus-noise ratio (SINR) data (e.g., long-term SINR data), and/or PMI data. Long-term SINR may include SINR statistics, such as an average SINR or a cumulative distribution function (CDF) of SINR. The long-term SINR may be generated based on previous UE L1 measurements and may be more stable than SINR (e.g., short term or instantaneous SINR, such as a last measured SINR). "Long-term" may vary on operating conditions but includes the period of time where this metric is more stable than the instantaneous or short term SINR. The metric may depend on the movement speed and/or Doppler Frequency. As illustrative, non-limiting examples, long-term may include 10 slots, 20 slots, 50 slots, 100 slot, 200 slots, 500 slots, 1000 slots, 2000 slots, 5000 slots, etc. By using the long-term SINR to calculate the first window length and/or the second window length, more accurate precoding can be performed for high Doppler and/or mobility scenarios. In many scenarios longer slot durations tend to increase the throughput and the gain.

Transmitter 410 is configured to transmit data to one or more other devices, and receiver 412 is configured to receive data from one or more other devices. For example, transmitter 410 may transmit data, and receiver 412 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 410 and receiver 412 may be replaced with a transceiver. Additionally, or alternatively, transmitter 410, receiver, 412, or both may include or correspond to one or more components of UE 115 described with reference to FIG. 2.

Encoder 413 and decoder 414 may be configured to encode and decode data for transmission. Beam specific failure manager 415 may be configured to determine and perform beam specific failure operations. For example, CSI report age manager 415 is configured to performed CSI report age determination, generation, and/or reporting operations. As an illustrative example of determination operations, the CSI report age manager 415 may determine the second window. To illustrate, the CSI report age manager 415 may determine a number of slots for the second window based on device settings (e.g., standard or region settings), network indication, or based on device side calculation or look-up. As an illustrative example of generation operations, the CSI report age manager 415 may determine the structure of the CSI Report, that is what to include in the CSI report and how to arrange the items/fields of the report. As an illustrative example of reporting operations, the CSI report age manager 415 may determine when to report (e.g., the CSI report slot) the CSI information and how to report the CSI. That is, by what message or mechanism is the CSI report to be sent.

Channel measurement manager 416 may be configured to determine and perform channel measurement operations. For example, channel measurement manager 416 is configured to determine what channel measurement operation to perform and/or on what type of signal or transmission to perform it on, such as CSI-RS, DMRS, or both. As another example, the channel measurement manager 416 is configured to determine the first window 452, that is for how long and/or on which slots to perform the channel measurements.

Base station 105 includes processor 430, memory 432, transmitter 434, receiver 436, encoder 437, decoder 438, CSI report age manager 439, channel measurement manager 440, and antennas 234*a-t*. Processor 430 may be configured to execute instructions stores at memory 432 to perform the operations described herein. In some implementations, processor 430 includes or corresponds to controller/processor 240, and memory 432 includes or corresponds to memory 242. Memory 432 may be configured to store first window data 406, second window data 408, Doppler frequency data 442, settings data 444, or a combination thereof, similar to the UE 115 and as further described herein.

Transmitter 434 is configured to transmit data to one or more other devices, and receiver 436 is configured to receive data from one or more other devices. For example, transmitter 434 may transmit data, and receiver 436 may receive data, via a network, such as a wired network, a wireless network, or a combination thereof. For example, base station 105 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 434 and receiver 436 may be replaced with a transceiver. Additionally, or alternatively, transmitter 434, receiver, 436, or both may include or correspond to one or more components of base station 105 described with reference to FIG. 2.

Encoder 437, and decoder 438 may include the same functionality as described with reference to encoder 413 and decoder 414, respectively. CSI report age manager 439 may include similar functionality as described with reference to CSI report age manager 415. Channel measurement manager 440 may include similar functionality as described with reference to channel measurement manager 416.

During operation of wireless communications system 400, base station 105 may determine that UE 115 has enhanced CSI age reporting capability. For example, base station 105 may transmit a message 448 that includes a CSI age reporting indicator 490. Indicator 490 may indicate enhanced CSI age reporting operations or a particular type or mode of CSI age reporting operations. In some implementations, a base station 105 sends control information to indicate to UE 115 that enhanced CSI age reporting operations and/or a particular type of enhanced CSI age reporting operations are to be used. For example, in some implementations, message 448 (or another message, such as configuration transmission 450) is transmitted by the base station 105. The configuration transmission 450 may include or indicate to use enhanced CSI age reporting operations or to adjust or implement a setting of a particular type of CSI age reporting operations. For example, the configuration transmission 450 may include settings data 444, as indicated in the example of FIG. 4, in addition to or in the alternative of the first window data 406 and/or the second window data 408.

During operation, devices of wireless communications system 400, perform CSI age reporting operations. For example, the wireless communication devices (e.g., a base station and UE) exchange transmissions when operating in high mobility/high Doppler frequency conditions. As another example, the devices may be operating in a rateless code based rate control mode or a long-term SINR based rate control mode. In some implementations, as illustrated in FIG. 4, the transmission are exchanged via a downlink or uplink channel in NR-U. Alternatively, wireless communication devices (e.g., two UEs) exchange transmissions via a sidelink channel.

In the example of FIG. 4, the base station 105 transmits a message 452 to the UE 115. The message 452 may include or correspond to a RRC message, a MAC CE, a DCI. In some implementations the message 452 includes or corresponds to an uplink grant message which may include or indicate one or more uplink grant instances for the UE 115.

In some implementations, the message 452 is a trigger message which is configured to indicate or trigger CSI reporting by the UE 115. The trigger message may indicate, directly or indirectly, a particular slot for CSI reporting.

Additionally, or alternatively, the message 452 may optionally indicate any of the first window, the second window, the Doppler frequency, a plurality of BLER thresholds, CQI information (such as for two or more of the BLER thresholds), or any combination thereof. The plurality of BLER thresholds may include or correspond to target BLERs. For a particular target BLER, the actual BLER based on the reported CQI during the length of the first window (W1) prior to the CSI report shall not exceed the target BLER. Exemplary BLERs include 0.1, 0.05, 0.15, etc.

The UE 115 may receive the message 452 and may determine the first window. The UE 115 (e.g., the CSI age manager 415) may determine the first window (or first window length) based on the configuration transmission 450, based on the message 452, or both. Additionally, or alternatively, the UE 115 may determine the first window based on one or more parameters or metrics determined by the UE 115, such as long term metrics, Doppler Frequency, etc. A codebook, as described with reference to FIG. 6, may also be used to determine the first window.

During the first window, the UE 115 (e.g., the channel measurement manager 416) performs channel measurements operations on received signals (e.g., CSI-RS or DMRS) to generate channel measurement information or channel state information. The UE 115 (e.g., the CSI age manager 415) may then generate a CSI report based on the performed measurements, such as the channel measurement information or channel state information.

The CSI report indicates a validity window or age of the CSI report by indication of a second window in the CSI report. The indication of the second window may be explicit or direct, such as by a field. Alternatively, the second window may be indirectly indicated, such as through an index and codebook, as described further below.

The UE 115 (e.g., the CSI age manager 415) may determine or generate the second window (e.g., second window data 408) based on a formula or a codebook. For example, the UE 115 may utilize a codebook to generate the second window or length (e.g., duration or number of slots thereof) based on a codebook. The codebook may have inputs of the first window, CSI parameters (e.g., long-term SINR), the Doppler frequency, or any combination thereof. The determination of the second window is performed by the UE 115 and provides enhanced information to a second device (e.g., base station 105 or another UE. such as second UE 405).

The UE 115 transmits the CSI report 454 to the base station 105 indicating the second window. The base station 105 receives the CSI report 454 and determines the second window from the CSI report 454. The CSI report 454 may be included in a CSI report message. The CSI report is associated with two windows, the first window and the second window. That is the CSI report 454 is generated during one window (the first window, W1) and is valid for use during another window (the second window, W2). The CSI 454 may further indicate one or more of the first window, the Doppler frequency, BLER thresholds, or CQI for the BLER thresholds. The CSI report 454 may further include a rank indicator (RI), a MCS, and/or a PMI.

The base station 105 may then generate and transmit data transmissions based on the CSI report 454 during the second window. For example, the base station 105 optionally transmits a PDSCH transmission 456 during the second window. To illustrate, the base station 105 generates or determines a precoder and MCS to use based on the CSI report 454.

The base station 105 may generate and transmit second data transmissions independent of the CSI report 454 after the second window. The second data transmissions may be based on a second CSI report which was generated based on measurements during a third window (second W1) and which occur during a fourth window, such as a second W2.

Accordingly, the UE 115 and base station 105 may be able to perform CSI age reporting and more effectively perform CSI report operations and PMI operations. Thus, FIG. 4 describes enhanced CSI age reporting operations for wireless communication devices. Using enhanced CSI age reporting operations may enable improvements when devices are operating in high mobility and/or high Doppler frequency use cases. Performing enhanced CSI age reporting operations enable increased precoding performance and thus, enhanced UE and network performance by increasing throughput and reducing errors and latency.

Figure 5:
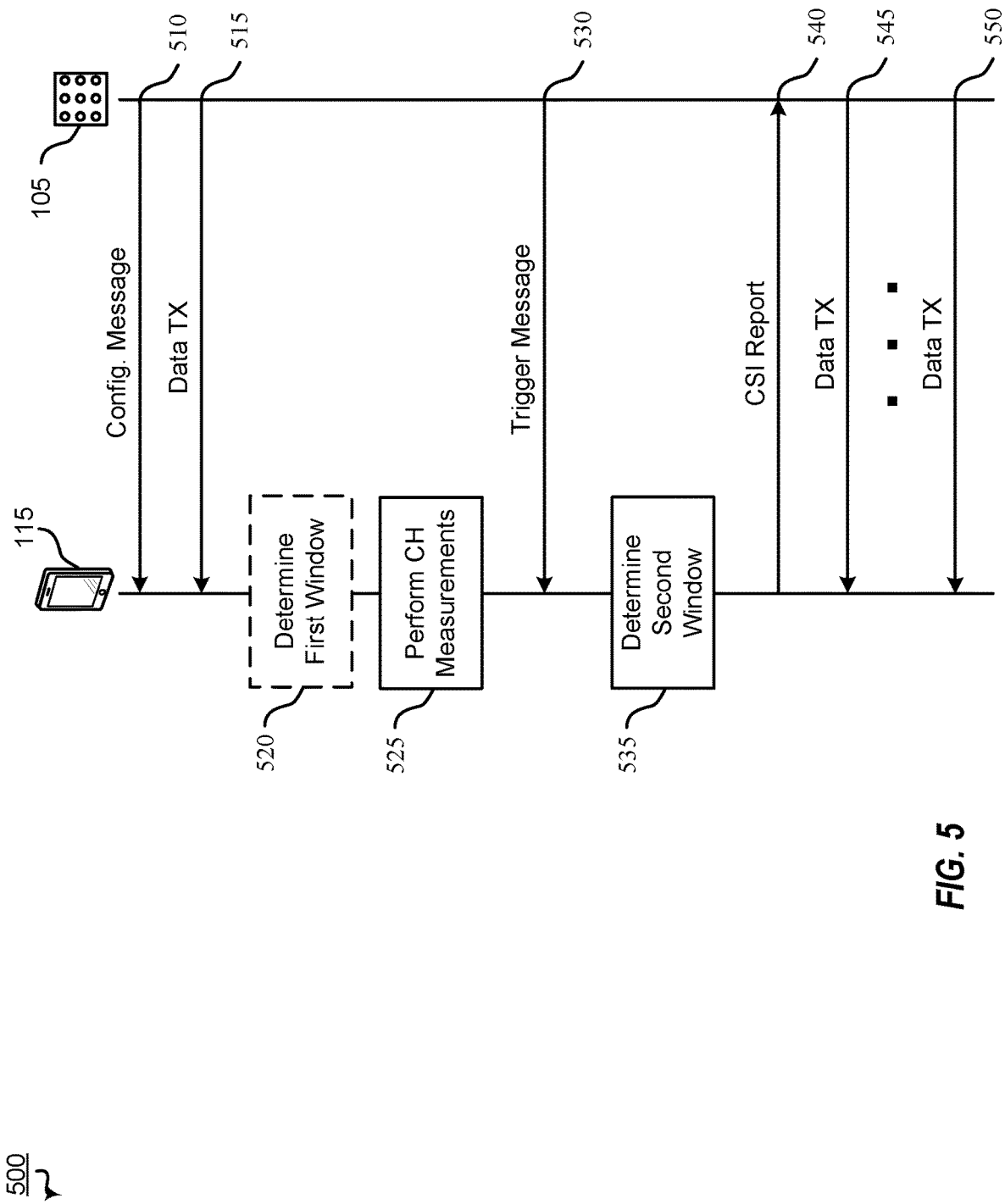
FIG. 5 is a ladder diagram illustrating an example wireless communication system that supports CSI age reporting operations according to one or more aspects.

FIG. 5 illustrates an examples of a ladder diagram for CSI age reporting operations according to some aspects. Referring to FIG. 5, FIG. 5 is a ladder diagram 500 of CSI age reporting operations for higher layer configuration of CSI age reporting and dynamic CSI report scheduling. In the example of FIG. 5, the ladder diagram illustrates a UE 115 and a network entity, such as base station 105. The diagram is simplified for illustration and explanation. In practice, many UEs may be connected to the network entity, and optionally, some UEs may be connected to multiple network entities and/or other UEs.

At 510, the base station 105 transmits a configuration message. For example, the base station 105 transmits a higher layer message (e.g., RRC) indicating to enable CSI age reporting. The configuration message may further include data indicating one or more configurations for the CSI age reporting.

At 515, the base station 105 transmits a data transmission. For example, the base station 105 transmits a PDSCH. The data transmission may include one or more reference signals. For example, the data transmission may include one or more symbols of CSI-RS, DMRS, or both. Alternatively, the base station 105 may transmit another communication with one or more other reference signals. In a particular implementation, the base station 105 may transmit two or multiple communications, each with different reference signals.

At 520, the UE 115 optionally determines the first window (W1). For example, the UE 115 determines the first window based on one or more settings or parameters at the UE. The first window may be determined based on long-term SINR, such as a CDF of SINR over a number of slots. In a particular implementation, the UE 115 further determines the first window (W1) based on one or more inputs from the network, such as the base station 105. Additionally, or alternatively, the network, such as the base station 105, may set or indicate the first window (such as by indicating the first window length) in the configuration message or another message.

At 525, the UE 115 performs a channel measurement operations for a first window (W1). For example, the UE 115 performs channel measurement operations on received signals during the first window, such as the data transmission at 515. In a particular implementation, the UE 115 performs channel measurements on all CSI-RS (e.g., NZP-CSI-RS) received during the first window. In other implementations, UE 115 performs channel measurements on all DMRS received during the first window or UE 115 performs channel measurements on all CSI-RS (e.g., NZP-CSI-RS) and DMRS received during the first window.

At 530, the base station 105 transmits a trigger message. For example, the base station 105 transmits a lower layer message (e.g., DCI) indicating to prepare a CSI report with age information, such as second window information. The trigger message may indicate a slot for the UE 115 to feedback the CSI report. The trigger message may further include data indicating one or more configurations for the CSI age reporting in addition to the configuration or in the alternative to the configuration message. In some implementations, the UE 115 may perform a channel measurement on the trigger message as well.

At 535, the UE 115 determines the second window (W2). For example, a CSI age manager 415 of the UE 115 determines the second window based on the channel measurement information determined during the first window. The second window may be determined based on long-term SINR.

At 540, the UE 115 generates and transmits a CSI report indicating the second window based on the trigger message. For example, a CSI age manager 415 of the UE 115 generates a CSI report which includes the second window duration in the slot indicated by the trigger message, and a transmitter of the UE 115 transmits the CSI report via wireless radios and antennas of the UE 115. As another example, the UE 115 transmits a CSI report which includes an index value which indicates the second window duration, and optionally, one or more other parameters.

At 545, the base station 105 generates and transmits a data transmission based on the CSI report and during the second window. For example, base station 105 generates a PDSCH based on a PMI indicated by the CSI report during a slot of the second window. The base station 105 may generate and transmit multiple transmissions, such as data and/or control transmissions, during the second window and based on the CSI report. The transmissions may be generated based on inputs from the CSI age manager 439.

Prior to 550, the second window ends. At 545, the base station 105 generates and transmits another data transmission independent of the CSI report and outside of the second window. For example, base station 105 generates a PDSCH based on another method or based on a second CSI report, which may or may not have aging/validity information (e.g., second window, W2 information). The transmissions may be generated based on an input from the CSI age manager 439, such as to not use the CSI report information in generating the data transmission.

Thus, in the example in FIG. 5, the UE provides age/validity information for the CSI report. The network (or another UE) may then use the age/validity information for the CSI report to for a specific period of time while such information is likely to lead to increased performance and/or when such information is likely not to cause poor performance. The network or other device may then either ask for an updated report or use another method to improve or reduce a drop in performance.

FIG. 6 is an example of codebooks for determining and indicating parameters for enhanced CSI age reporting operations. In FIG. 6, three example codebooks are illustrated. The codebooks in FIG. 6 are simplified for illustration and explanation. In other implementations, the codebooks may include additional parameters. For example, in addition to or in the alternative of Doppler Frequency, one or more other metrics or parameters may be used, such as long-term SINR, BLER thresholds, CQI, previous UE layer 1 measurements, etc. The codebooks may include or correspond to tables, such as a look-up table.

A first codebook 600 illustrates index values which are associated with Doppler Frequency, a first window length (W1), and a second window length (W2). The first codebook 600 may be used to determine the Doppler Frequency, the W1, and the W2 based on the index value. For example, the UE 115 may determine the index value based on the Doppler Frequency, the W1, and the W2, and indicate the index value in the CSI report. In such implementations, each of the Doppler Frequency, the W1, and the W2 may either be received be or determined by the UE 115.

A second codebook 610 illustrates index values which are associated with Doppler Frequency and W1. The second codebook 610 may be used to determine the Doppler Frequency and the W1 based on the index value. For example, the UE 115 may receive the index value in a message from the network and determine the Doppler Frequency and the W1 based on the index value.

A third codebook 620 illustrates index values which are associated with Doppler Frequency and W2. The third codebook 620 may be used to indicate the Doppler Frequency and the W2 based on the index value. For example, the UE 115 may determine the index value based on the Doppler Frequency and the W2, and the UE 115 may indicate the index value in the CSI report. The network may determine the Doppler Frequency and the W2 based on the index value. In such implementations, the Doppler Frequency may be received from another device or determined by the UE 115, and the W2 may be determined by the UE 115 by another method, such as another codebook or a formula/equation.

Additionally, or alternatively, the third codebook 620 may be used to indicate and determine a particular parameter. For example, the UE 115 may determine the W2 and the index value based on the Doppler Frequency, and then use the index value to indicate the W2 (and optionally the Doppler Frequency) to the network. In some implementations, multiple codebooks may be used, such as two codebooks, one for each of W1 and W2.

Although the above codebooks were directed to window length, a codebook may be associated with window length and a window length index, similar to a CQI table. For example, the window length may indicate a number of slots, and a window length index could be used to indicate a number of slots. As an illustrative example, index valued of 0-7 could indicate slot values of 10, 20, 50, 100, 200, 500, 1000, and 2000 slots respectively.

In the alternative to codebooks, a formula or equation may be used to generate one or more parameters, such as W2. In some such implementations, a codebook (and resulting index value) may still be used to indicate multiple parameters with a single value.

Additionally, or alternatively, one or more operations of FIGS. 4-6 may be added, removed, substituted in other implementations. For example, in some implementations, the example steps of FIGS. 5 and 6 may be used together. To illustrate, a device may perform the codebook operations of FIG. 6 to determine and/or indicate parameters in the operations of FIG. 5.

Figures 7, 8:
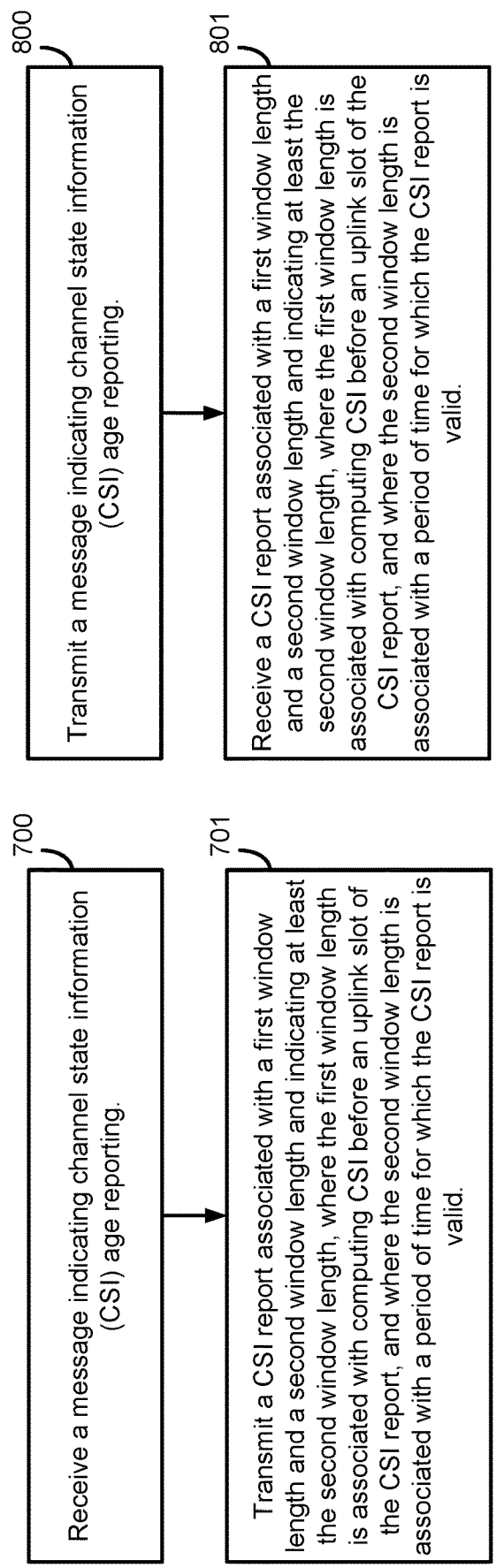
FIG. 7 is a flow diagram illustrating an example process that supports CSI age reporting operations according to one or more aspects.
FIG. 8 is a flow diagram illustrating an example process that supports CSI age reporting operations according to one or more aspects.
Figure 9:
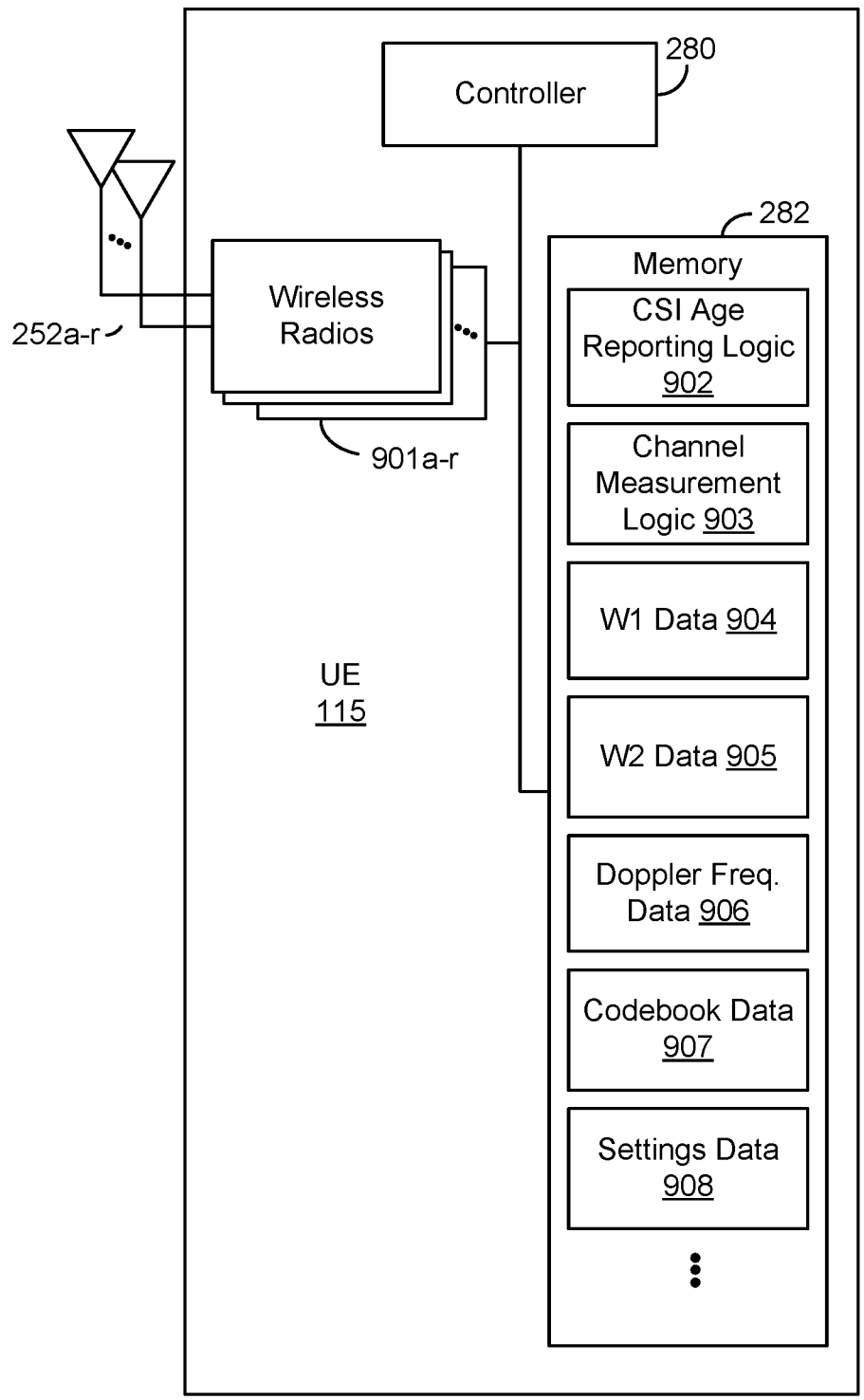
FIG. 9 is a block diagram of an example UE that supports CSI age reporting operations according to one or more aspects.

FIG. 7 is a flow diagram illustrating example blocks executed by a wireless communication device (e.g., a UE or base station) configured according to an aspect of the present disclosure. The example blocks will also be described with respect to UE 115 as illustrated in FIG. 9. FIG. 9 is a block diagram illustrating UE 115 configured according to one aspect of the present disclosure. UE 115 includes the structure, hardware, and components as illustrated for UE 115 of FIGS. 2 and/or 4. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 901a-r and antennas 252a-r. Wireless radios 901a-r includes various components and hardware, as illustrated in FIG. 2 for UE 115, including modulator/demodulators 254a-r, MIMO detector 256, receive processor 258, transmit processor 264, and TX MIMO processor 266. As illustrated in the example of FIG. 9, memory 282 stores CSI age reporting logic 902, channel measurement logic 903, first window data 904, second window data 905, Doppler Frequency data 906, codebook data 907, and settings data 908. The data (902-908) stored in the memory 282 may include or correspond to the data (406, 408, 442, 444) stored in the memory 404.

At block 700, a wireless communication device, such as a UE, receives a message indicating channel state information (CSI) age reporting. For example, the UE 115 receives a message (e.g., message 452) indicating to perform CSI age reporting, as described with reference to FIGS. 4-6. To illustrate, a receiver (e.g., receive processor 258 or receiver 412) of the UE 115 receives a configuration message, such as at 510, indicating CSI age reporting settings via wireless radios 901a-r and antennas 252a-r. As another example, the UE 115 receives a trigger message, such as at 525, which indicates to transmit a CSI report. Either message may optionally indicate the first window length W1.

At block 701, the UE 115 transmits a CSI report associated with a first window length and a second window length and indicating at least the second window length. The first window length is associated with computing CSI before an uplink slot of the CSI report, and the second window length is associated with a period of time for which the CSI report is valid. For example, the UE 115 transmits a CSI report, as described with reference to FIGS. 4-6. To illustrate, a transmitter (e.g., transmit processor 264/TX MIMO processor 266 or transmitter 410) of the UE 115 transmits a CSI report 454 indicating at least the second window length, W2, via wireless radios 901a-r and antennas 252a-r. The transmitter may utilize one or more of the CSI age reporting logic 902, channel measurement logic 903, first window data 904, second window data 905, Doppler Frequency data 906, codebook data 907, or settings data 908 to generate the CSI report.

The wireless communication device (e.g., UE or base station) may execute additional blocks (or the wireless communication device may be configured further perform additional operations) in other implementations. For example, the wireless communication device (e.g., the UE 115) may perform one or more operations described above. As another example, the wireless communication device (e.g., the UE 115) may perform one or more aspects as presented below.

In a first aspect, the message comprises a CSI trigger message.

In a second aspect, alone or in combination with the first aspect, the message comprises a RRC message.

In a third aspect, alone or in combination with one or more of the above aspects, the CSI report is included in a CSI report message.

In a fourth aspect, alone or in combination with one or more of the above aspects, the first window length is indicated by a second wireless communication device (e.g., network/base station).

In a fifth aspect, alone or in combination with one or more of the above aspects, the wireless communication device further: performs channel measurements based on NZP-CSI-RS, DMRS, or both, to generate channel measurement data; and generates the CSI report (e.g., CSI report information) based on the channel measurement data.

In a sixth aspect, alone or in combination with one or more of the above aspects, the CSI report include channel quality information (CQI) for multiple BLER thresholds.

In a seventh aspect, alone or in combination with one or more of the above aspects, the multiple BLER thresholds are determined based on a mode or a region (e.g., set by a standard).

In an eighth aspect, alone or in combination with one or more of the above aspects, the UE 115 receives the multiple BLER thresholds from a second wireless communication device. For example, the UE 115 receives the multiple BLER thresholds from a network device or base station either in the message (e.g., a trigger message or DCI) or in another message, such as a RRC message.

In a ninth aspect, alone or in combination with one or more of the above aspects, the UE 115 further determines the multiple BLER thresholds based on a target BLER (e.g., statically or semi-statically set), CQI, or both.

In a tenth aspect, alone or in combination with one or more of the above aspects, the UE 115 further determines the first window length, the second window length, or both based on Doppler frequency (e.g., movement/mobility).

In an eleventh aspect, alone or in combination with one or more of the above aspects, the message comprises a trigger message and indicates the wireless communication device feedback the first window length and the second window length in the CSI report, and wherein the CSI report further indicates the first window length.

In an twelfth aspect, alone or in combination with one or more of the above aspects, the UE 115 further: receives a configuration message indicating the first window length, wherein the message comprises a trigger message and indicates that the wireless communication device feedback the second window length; and performs channel measurements during a first window indicated by the first window length, wherein the CSI report is determined based on the channel measurements.

In a thirteenth aspect, alone or in combination with one or more of the above aspects, the configuration message is a RRC message, a MAC CE, or a DCI.

In a fourteenth aspect, alone or in combination with one or more of the above aspects, the UE 115 further determines the second window length based on Doppler frequency, long-term SINR (e.g., previous UE LI measurements), or both. Long-term SINR may include the SINR statistics, such as the CDF of SINR. This metric may be more stable than SINR. "Long-term" may vary on operating conditions but includes the period of time where this metric is more stable than the instantaneous or short term SINR. The metric may depend on the movement speed and/or Doppler Frequency. As illustrative, non-limiting examples, long-term may include 10 slots, 20 slots, 50 slots, 100 slot, 200 slots, 500 slots, 1000 slots, 2000 slots, 5000 slots, etc.

In a fifteenth aspect, alone or in combination with one or more of the above aspects, the message indicates a plurality of BLER thresholds, and wherein the CSI report indicates CQI for two or more BLER thresholds of the plurality of BLER thresholds, the first window length, and the second window length.

In a sixteenth aspect, alone or in combination with one or more of the above aspects, the message indicates a plurality of BLER thresholds and the first window length, and wherein the CSI report indicates CQI for two or more BLER thresholds of the plurality of BLER thresholds and indicates the second window length.

In a seventeenth aspect, alone or in combination with one or more of the above aspects, the message comprises a trigger message which indicates the CSI report, and wherein the CSI report indicates a plurality of BLER thresholds, CQI for two or more BLER thresholds of the plurality of BLER thresholds, and the second window length.

In an eighteenth aspect, alone or in combination with one or more of the above aspects, the message indicates a plurality of BLER thresholds, CQI for two or more BLER thresholds of the plurality of BLER thresholds, and the second window length.

In a nineteenth aspect, alone or in combination with one or more of the above aspects, the message indicates to generate channel measurements during a first window, indicated by the first window length, based on non-zero power channel state information reference signal (NZP-CSI-RS), and wherein the CSI report is generated based on the channel measurements.

In a twentieth aspect, alone or in combination with one or more of the above aspects, the message indicates to generate channel measurements during a first window, indicated by the first window length, based on demodulation reference signal (DMRS), and wherein the CSI report is generated based on the channel measurements.

In a twenty-first aspect, alone or in combination with one or more of the above aspects, the message indicates to generate channel measurements during a first window, indicated by the first window length, based on non-zero power channel state information reference signal (NZP-CSI-RS) and demodulation reference signal (DMRS), and wherein the CSI report is generated based on the channel measurements.

In a twenty-second aspect, alone or in combination with one or more of the above aspects, the first window length, the second window length, the Doppler frequency, or a combination thereof are indicated by an index value, and the UE 115 further determines the index value from a codebook based on the first window length, the second window length, the Doppler frequency, or a combination thereof, wherein the CSI report indicates the index value. In some implementations, the codebook is used to determine one or more parameters based on indications (e.g., an index value) in message from the network, such as BLER thresholds, Doppler Frequency, W1, CQI, etc., or a combination thereof. Additionally, or alternatively, the codebook (or another codebook) may be used to determine the one or more parameters, such as W2, based metrics determined by the UE (e.g., long-term SINR, Doppler Frequency, etc.). In addition to or in the alternative of, a second codebook may be to generate a second index value to indicate one or more second parameters, such as at least W2, to the network.

In a twenty-third aspect, alone or in combination with one or more of the above aspects, the index value is determined based on the first window length and the Doppler frequency.

In a twenty-fourth aspect, alone or in combination with one or more of the above aspects, the index value is determined based on the second window length and the Doppler frequency.

In a twenty-fifth aspect, alone or in combination with one or more of the above aspects, the index value is determined based on the first window length, the second window length, and the Doppler frequency.

In a twenty-sixth aspect, alone or in combination with one or more of the above aspects, the wireless communication device performs rateless code based rate control for high Doppler channels.

In a twenty-seventh aspect, alone or in combination with one or more of the above aspects, the wireless communication device performs long-term SINR based rate control.

In a twenty-eighth aspect, alone or in combination with one or more of the above aspects, the UE is not configured with a higher layer parameter of timeRestrictionForChannelMeasurements when CSI age reporting is enabled.

Accordingly, wireless communication devices may perform enhanced CSI age reporting operations. By performing enhanced CSI age reporting operations throughput may be increased and latency and errors may be reduced by the increased accuracy of the precoding operation.

Figure 10:
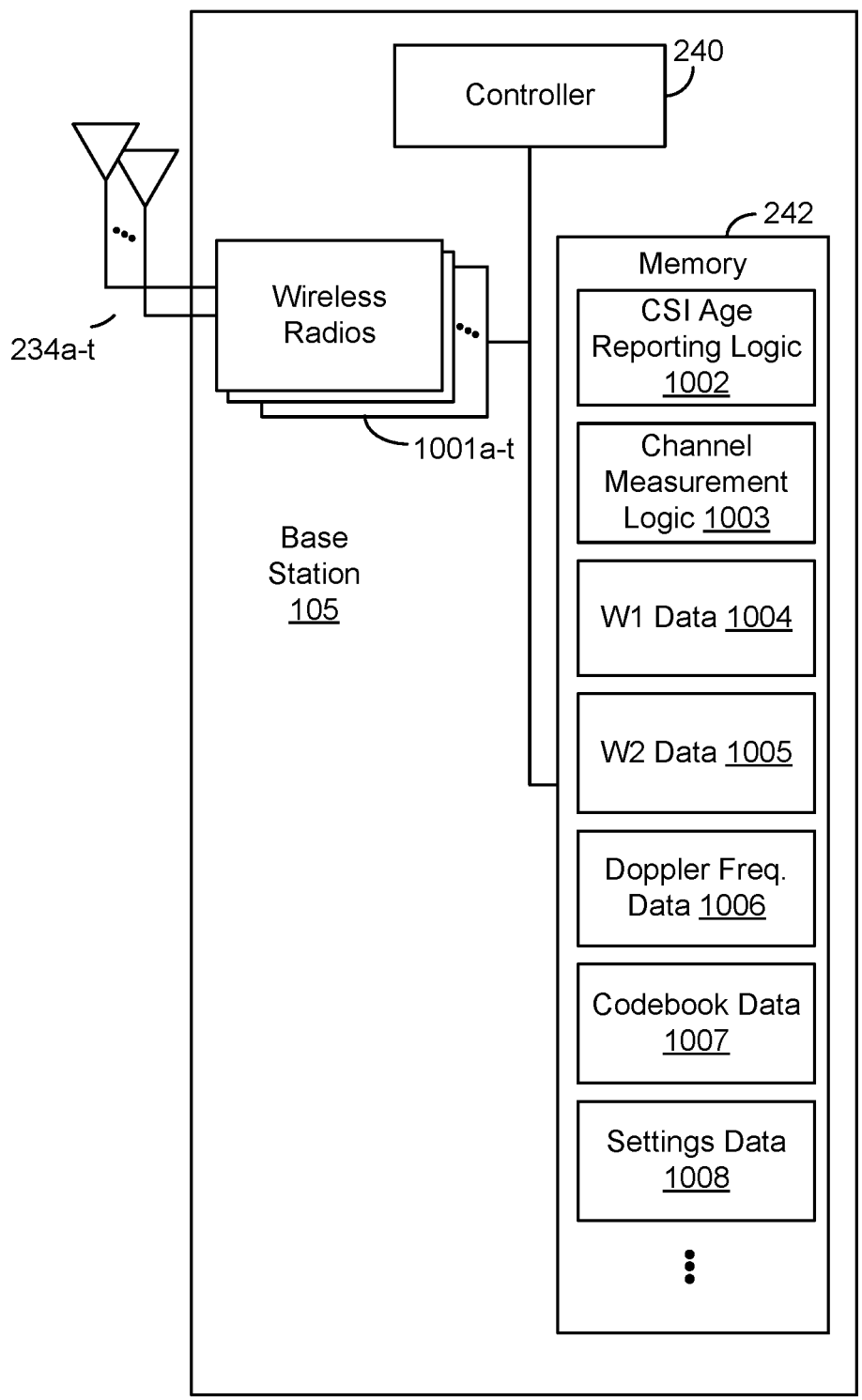
FIG. 10 is a block diagram of an example base station that supports CSI age reporting operations according to one or more aspects.

FIG. 8 is a flow diagram illustrating example blocks executed wireless communication device (e.g., a UE or base station) configured according to an aspect of the present disclosure. The example blocks will also be described with respect to base station 105 as illustrated in FIG. 10. FIG. 10 is a block diagram illustrating base station 105 configured according to one aspect of the present disclosure. Base station 105 includes the structure, hardware, and components as illustrated for base station 105 of FIGS. 2 and/or 4. For example, base station 105 includes controller/processor 280, which operates to execute logic or computer instructions stored in memory 282, as well as controlling the components of base station 105 that provide the features and functionality of base station 105. Base station 105, under control of controller/processor 280, transmits and receives signals via wireless radios 1001$a$-$t$ and antennas 234$a$-$t$. Wireless radios 1001$a$-$t$ includes various components and hardware, as illustrated in FIG. 2 for base station 105, including modulator/demodulators 232$a$-$r$, MIMO detector 236, receive processor 238, transmit processor 220, and TX MIMO processor 230. As illustrated in the example of FIG.

10, memory 282 stores CSI age reporting logic 1002, channel measurement logic 1003, first window data 1004, second window data 1005, Doppler Frequency data 1006, codebook data 1007, and settings data 1008.

At block 800, a wireless communication device, such as a base station 105, transmits a message indicating channel state information (CSI) age reporting. For example, the base station 105 transmits a message (e.g., message 452) indicating to perform CSI age reporting, as described with reference to FIGS. 4-5. To illustrate, a transmitter (e.g., transmit processor 220/TX MIMO processor 230 or transmitter 434) of the base station 105 transmits a configuration message, such as at 510, indicating CSI age reporting settings via wireless radios 1001a-t and antennas 234a-t. As another example, the base station 105 transmits a trigger message, such as at 525, which indicates to transmit a CSI report. Either message may optionally indicate the first window length W1.

At block 801, the base station 105 receives a CSI report associated with a first window length and a second window length and indicating at least the second window length. The first window length is associated with computing CSI before an uplink slot of the CSI report, and the second window length is associated with a period of time for which the CSI report is valid. For example, the base station 105 receives a CSI report, as described with reference to FIGS. 4-6. To illustrate, a receiver (e.g., a receive processor 238 or receive 436) the base station 105 receives a CSI report 454 indicating at least the second window length, W2, via wireless radios 1001a-t and antennas 234a-t.

The wireless communication device (e.g., such as UE or base station) may execute additional blocks (or the wireless communication device may be configured further perform additional operations) in other implementations. For example, the wireless communication device may perform one or more operations described above. As another example, the wireless communication device may perform one or more aspects as described with reference to FIG. 7.

In a first aspect, the wireless communication device further transmits a second downlink channel transmission after the validity window independent of the CSI report and based on a legacy or previous CSI report procedure. The legacy or previous CSI report procedure may not indicate age reporting or validity timing of the CSI report. Such legacy or previous CSI report procedure may be CQI based and/or loop based, such as outer loop link adaption (OLLA) In a second aspect, alone or in combination with the first aspect, the wireless communication device further transmits a trigger message to indicate transmission of a second CSI report, the second CSI report associated with a third window length and a fourth window length. The trigger message may be transmitted prior to an end of the validity window or after the validity window.

In a third aspect, alone or in combination with one or more of the above aspects, the wireless communication device further transmits a second downlink channel transmission after the validity window based on the CSI report.

Accordingly, wireless communication devices may perform enhanced CSI age reporting operations. By performing enhanced CSI age reporting operations throughput may be increased and latency and errors may be reduced by the increased accuracy of the precoding operations.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-10 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication comprising:
   receiving, by a wireless communication device, a message indicating channel state information (CSI) age reporting; and
   transmitting, by the wireless communication device, a CSI report associated with a first window length and a second window length and indicating at least the second window length, wherein the first window length is associated with computing CSI before an uplink slot of the CSI report, and wherein the second window length is associated with a period of time for which the CSI report is valid.

2. The method of claim 1, wherein the message comprises a CSI trigger message.

3. The method of claim 1, wherein the message comprises a (radio resource control (RRC) message.

4. The method of claim 1, wherein the CSI report is included in a CSI report message.

5. The method of claim 1, wherein the first window length is indicated by a second wireless communication device.

6. The method of claim 1, further comprising:
performing, by the wireless communication device, channel measurements based on non-zero power channel state information reference signals (NZP-CSI-RS), demodulation reference signals (DMRS), or both, to generate channel measurement data; and
generating, by the wireless communication device, the CSI report based on the channel measurement data.

7. The method of claim 1, wherein the CSI report include channel quality information (CQI) for multiple block error rate (BLER) thresholds.

8. The method of claim 7, wherein the multiple BLER thresholds are determined based on a mode or a region.

9. The method of claim 7, further comprising:
receiving the multiple BLER thresholds from a second wireless communication device.

10. The method of claim 7, further comprising:
determining the multiple BLER thresholds based on a target BLER, CQI, or both.

11. The method of claim 1, further comprising:
determining the first window length, the second window length, or both based on Doppler frequency.

12. An apparatus for wireless communication comprising:
a processor; and
a memory coupled to the processor, the memory storing instructions which when executed by the processor cause the processor to:
receive, a message indicating channel state information (CSI) age reporting; and
transmit a CSI report associated with a first window length and a second window length and indicating at least the second window length, wherein the first window length is associated with computing CSI before an uplink slot of the CSI report, and wherein the second window length is associated with a period of time for which the CSI report is valid.

13. The apparatus of claim 12, wherein the message comprises a trigger message and indicates that the wireless communication device feedback the first window length and the second window length in the CSI report, and wherein the CSI report further indicates the first window length.

14. The apparatus of claim 12, further comprising:
receiving a configuration message indicating the first window length, wherein the message comprises a trigger message and indicates that the wireless communication device feedback the second window length; and
performing channel measurements during a first window indicated by the first window length, wherein the CSI report is determined based on the channel measurements.

15. The apparatus of claim 14, wherein the configuration message is a radio resource control (RRC) message, a medium access control element (MAC CE), or downlink control information (DCI).

16. The apparatus of claim 14, further comprising:
determining the second window length based on Doppler frequency, long-term Signal-to-interference-plus-noise ratio (SINR), or both.

17. The apparatus of claim 12, wherein the message indicates a plurality of block error rate (BLER) thresholds, and wherein the CSI report indicates channel quality information (CQI) for two or more BLER thresholds of the plurality of BLER thresholds, the first window length, and the second window length.

18. The apparatus of claim 12, wherein the message indicates a plurality of block error rate (BLER) thresholds and the first window length, and wherein the CSI report indicates channel quality information (CQI) for two or more BLER thresholds of the plurality of BLER thresholds and indicates the second window length.

19. The apparatus of claim 12, wherein the message comprises a trigger message which indicates the CSI report, and wherein the CSI report indicates a plurality of block error rate (BLER) thresholds, channel quality information (CQI) for two or more BLER thresholds of the plurality of BLER thresholds, and the second window length.

20. The apparatus of claim 12, wherein the message indicates a plurality of block error rate (BLER) thresholds, channel quality information (CQI) for two or more BLER thresholds of the plurality of BLER thresholds, and the second window length.

21. The apparatus of claim 12, wherein the first window length, the second window length, a Doppler frequency, or a combination thereof are indicated by an index value, and further comprising:
determining the index value from a codebook based on the first window length, the second window length, the Doppler frequency, or a combination thereof, wherein the CSI report indicates the index value.

22. A method of wireless communication comprising:
transmitting, by a wireless communication device, a message indicating channel state information (CSI) age reporting; and
receiving, by the wireless communication device, a CSI report associated with a first window length and a second window length and indicating at least the second window length, wherein the first window length is associated with computing CSI before an uplink slot of the CSI report, and wherein the second window length is associated with a period of time for which the CSI report is valid.

23. The method of claim 22, further comprising:
determining, by the wireless communication device, a precoding matrix identifier (PMI) and a modulation coding scheme (MCS) based on the CSI report;
determining, by the wireless communication device, the second window length based on the CSI report;
determining, by the wireless communication device, a validity window for the CSI report based on the second window length; and
transmitting, by the wireless communication device, a downlink channel transmission during the validity window based on the PMI and the MCS.

24. The method of claim 23, further comprising:
transmitting, by the wireless communication device, a second downlink channel transmission after the validity window independent of the CSI report and based on a previous CSI report procedure without age reporting.

25. The method of claim 23, further comprising:

transmitting, by the wireless communication device, a second downlink channel transmission after the validity window based on the CSI report.

26. The method of claim 22, further comprising:

transmitting, by the wireless communication device, a trigger message to indicate transmission of a second CSI report, the second CSI report associated with a third window length and a fourth window length.

27. An apparatus for wireless communication comprising:

a processor; and a memory coupled to the processor, the memory storing instructions which when executed by the processor cause the processor to:

transmit a message indicating channel state information (CSI) age reporting; and receive a CSI report associated with a first window length and a second window length and indicating at least the second window length, wherein the first window length is associated with computing CSI before an uplink slot of the CSI report, and wherein the second window length is associated with a period of time for which the CSI report is valid.

28. The apparatus of claim 27, wherein the message indicates to generate channel measurements during a first window, indicated by the first window length, based on non-zero power channel state information reference signal (NZP-CSI-RS), and wherein the CSI report is generated based on the channel measurements.

29. The apparatus of claim 27, wherein the message indicates to generate channel measurements during a first window, indicated by the first window length, based on demodulation reference signal (DMRS), and wherein the CSI report is generated based on the channel measurements.

30. The apparatus of claim 27, wherein the message indicates to generate channel measurements during a first window, indicated by the first window length, based on non-zero power channel state information reference signal (NZP-CSI-RS) and demodulation reference signal (DMRS), and wherein the CSI report is generated based on the channel measurements.

* * * * *